United States Patent [19]
Simamura

[11] Patent Number: 5,426,648
[45] Date of Patent: Jun. 20, 1995

[54] EFFICIENT PROGRAM DEBUGGING SYSTEM

[75] Inventor: Masahiko Simamura, Tokyo, Japan

[73] Assignee: NEC Corporation, Tokyo, Japan

[21] Appl. No.: 51,431

[22] Filed: Apr. 23, 1993

[30] Foreign Application Priority Data

Apr. 24, 1992 [JP] Japan .................... 4-105132

[51] Int. Cl.6 ............................. G06F 11/00
[52] U.S. Cl. ..................... 371/19; 395/700; 364/265; 364/280.4; 364/DIG. 1
[58] Field of Search ............ 395/500, 650, 700, 800; 371/19

[56] References Cited

U.S. PATENT DOCUMENTS

| | | | |
|---|---|---|---|
| 4,730,315 | 3/1988 | Saito et al. | 371/19 |
| 4,831,525 | 5/1989 | Saito et al. | 395/700 |
| 4,872,167 | 10/1989 | Maezawa et al. | 371/19 |
| 5,269,014 | 12/1993 | Ogino | 395/500 |
| 5,327,568 | 7/1994 | Maejima et al. | 395/800 |

Primary Examiner—Kevin A. Kriess
Assistant Examiner—Dennis M. Butler
Attorney, Agent, or Firm—Foley & Lardner

[57] ABSTRACT

According to the present invention, a program development support system prepares a correspondence information table to correlate the lines in the program specification with those for the source program generated based on that specification and stores it as the correspondence information file. By omitting the data in one-to-one correspondence between the specification lines and source program lines from the data in the correspondence information table, a line number information table can be obtained as a compression of the correspondence information table. This line number information table is transmitted from the host to the terminal. At the terminal, by reference to the transmitted line number table, the line number in the source program corresponding to a certain designated location in the specification can be searched for and displayed.

7 Claims, 6 Drawing Sheets

FIG. 2A

| SPECIFICATION PAGE | SPECIFICATION LINE | GENERATION START LINE | GENERATION END LINE |
|---|---|---|---|
| 1 | 1 | 1 | 1 |
| 1 | 2 | 2 | 2 |
| 1 | 3 | 3 | 3 |
| 1 | 4 | 4 | 5 |
| 1 | 5 | 6 | 8 |
| 1 | 6 | 9 | 9 |
| 1 | 7 | 10 | 10 |
| 2 | 1 | 11 | 11 |
| 2 | 2 | 12 | 12 |
| 2 | 3 | 13 | 13 |
| 2 | 4 | 14 | 14 |
| 2 | 5 | 15 | 15 |
| 2 | 6 | 16 | 20 |
| 2 | 7 | 21 | 21 |
| 2 | 8 | 22 | 22 |

CORRESPONDENCE INFORMATION TABLE 30

FIG. 2B

| SPECIFICATION PAGE | SPECIFICATION LINE | GENERATION START LINE (NUMBER OF COMPRESSIONS) | GENERATION END LINE |
|---|---|---|---|
| 1 | 1 | 1 | 1 |
| 1 | * | (2) | * |
| 1 | 4 | 4 | 5 |
| 1 | 5 | 6 | 8 |
| 1 | 6 | 9 | 9 |
| 1 | * | (1) | * |
| 2 | 1 | 11 | 11 |
| 2 | * | (4) | * |
| 2 | 6 | 16 | 20 |
| 2 | 7 | 21 | 21 |
| 2 | * | (1) | * |

LINE NUMBER INFORMATION TABLE 31

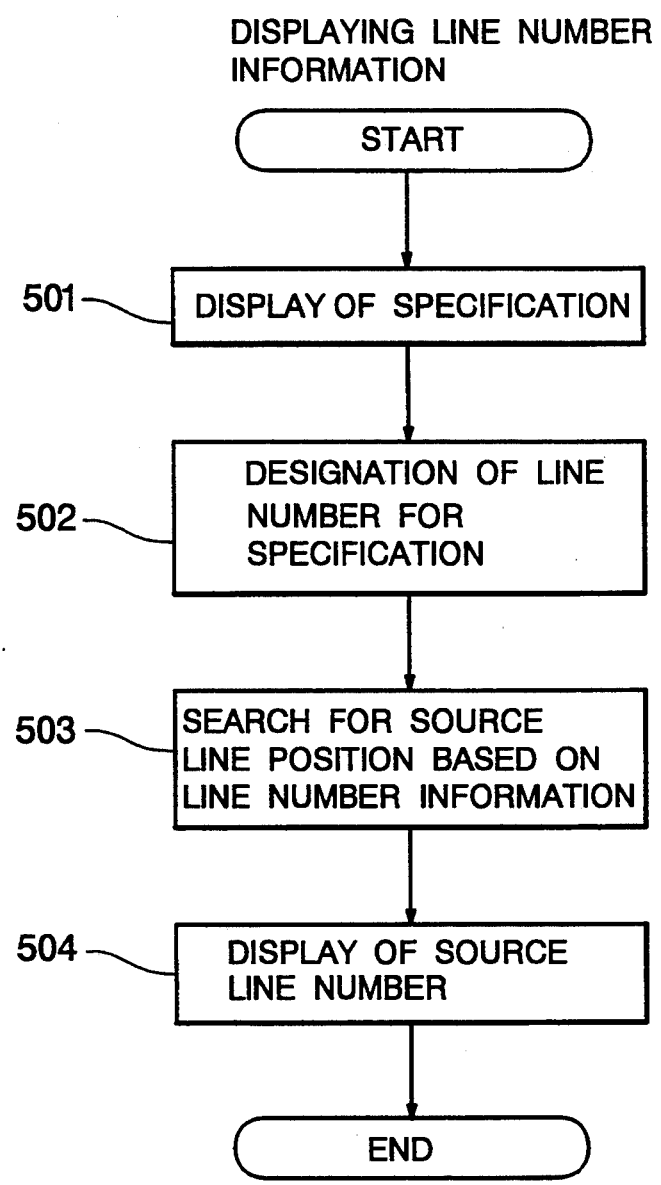

EFFICIENT PROGRAM DEBUGGING SYSTEM

BACKGROUND OF THE INVENTION

1. Field of the Invention

The present invention relates to a program development support system and particularly relates to a program development support system to generate a program in execution format from a specification being input.

2. Description of the Prior Art

A conventional program development support system comprises a specification preparation means to prepare a specification file on a terminal using data input with a terminal editor, a specification transmission means to transmit the specification file on the terminal to another specification file on the host, a source generation means to generate a source file from the specification file on the host, a compilation means to compile the source file to generate an object file and a link means which receives the object file and generates an execution format file.

The conventional program development support system as described above enables generation of an executable program only if the user prepares a specification. However, there is difficulty in debugging in case a failure is found in the program execution test. Though the message to locate the failure is given for the source program, the debugging must be done for the specification. Since the correspondence between the specification and the source program is not given in the conventional system, the user cannot debug the specification by referring to the source program.

Certainly, the line numbers for the source program upon generation can be transmitted to the terminal in order for reference to the source program during debugging in such a program development support system, but if the line number data of the source program are sent to the terminal as they are, they would require a long time for transmission due to their large amount, which prolongs the time for program development.

SUMMARY OF THE INVENTION

A first object of the present invention is to provide a program development support system which enables reference to the source program corresponding to the specification during debugging of the specification when the generated program is executed.

A second object of the present invention is to provide a program development support system capable of much quicker transmission to the terminal of the line number information for the specification and the source program than the conventional transmission of the source program line numbers as they are to the terminal, which prevents excessive prolongation of the program development time.

According to a preferred embodiment of the present invention to attain the first object above, a program development support system comprises a specification preparation means to prepare a specification, a specification file to store the specification, a source generation means to generate a source program based on the specification stored to the specification file, a source file to store the source program, a compilation means to compile the source program so as to prepare an object program, an object file to store the object program, a link means to prepare an executable program based on the object program, an execution file to store the executable program, a correspondence information preparation means to prepare a correspondence information table which contains location data consisting of pages and lines for the specification and the data indicating the lines where the generation starts and ends in the source program corresponding to the location data and a correspondence information file to store the correspondence information table.

According to a still preferred embodiment, a program development support system further comprising a line number information preparation means which reads the correspondence information table prepared by the correspondence information preparation means and, if a plurality of consecutive data indicate one-to-one correspondence between a line of the specification and a line of the source program, omits the consecutive correspondence information table data in order to generate a line number information table as the compression of the correspondence information table. In addition, it also comprises a line number information display means which displays the location in the source program corresponding to a designated location in the specification by referring to the line number information table.

According to another preferred embodiment of the present invention to attain the first and the second objects above, a program development support system comprises a specification preparation means to prepare a specification, a specification file on the terminal to store the specification, a transmission means to transmit the specification stored to the specification file to the host, a specification file on the host to store the transmitted specification, a source generation means to generate a source program based on the specification stored to the specification file on the host, a source file to store the source program, a compilation means to compile the source program so as to prepare an object program, an object file to store the object program, a link means to prepare an executable program based on the object program, an execution file to store the executable program, a correspondence information preparation means to prepare a correspondence information table which contains location data consisting of pages and lines for the specification and the data indicating the lines where the generation starts and ends in the source program corresponding to the location data, a line number information preparation means which reads the correspondence information table prepared by the correspondence information preparation means and, if a plurality of consecutive data indicate one-to-one correspondence between a line of the specification and a line of the source program, omits the consecutive correspondence information table data in order to generate a line number information table as the compression of the correspondence information table, a line number information file on the host to store the line number information table, a transmission means to transmit the line number information table in the line number information file on the host to the terminal, a line number information file on the terminal to store the transmitted line number information table, and a line number information display means which displays the location in the source program corresponding to a designated location in the specification read from the specification file on the terminal by referring to the line number information table in the line number information file on the terminal.

BRIEF DESCRIPTION OF THE DRAWINGS

FIG. 2A is a diagram to show an example of a correspondence information table,

FIG. 2B is a diagram to show an example of a line number information table created from the correspondence information table in FIG. 2A;

FIG. 5 is a flowchart to show the display processing by the line number information display means.

DESCRIPTION OF THE PREFERRED EMBODIMENT

Referring to the attached figures, preferred embodiments of the present invention will be described below.

Figure 1:
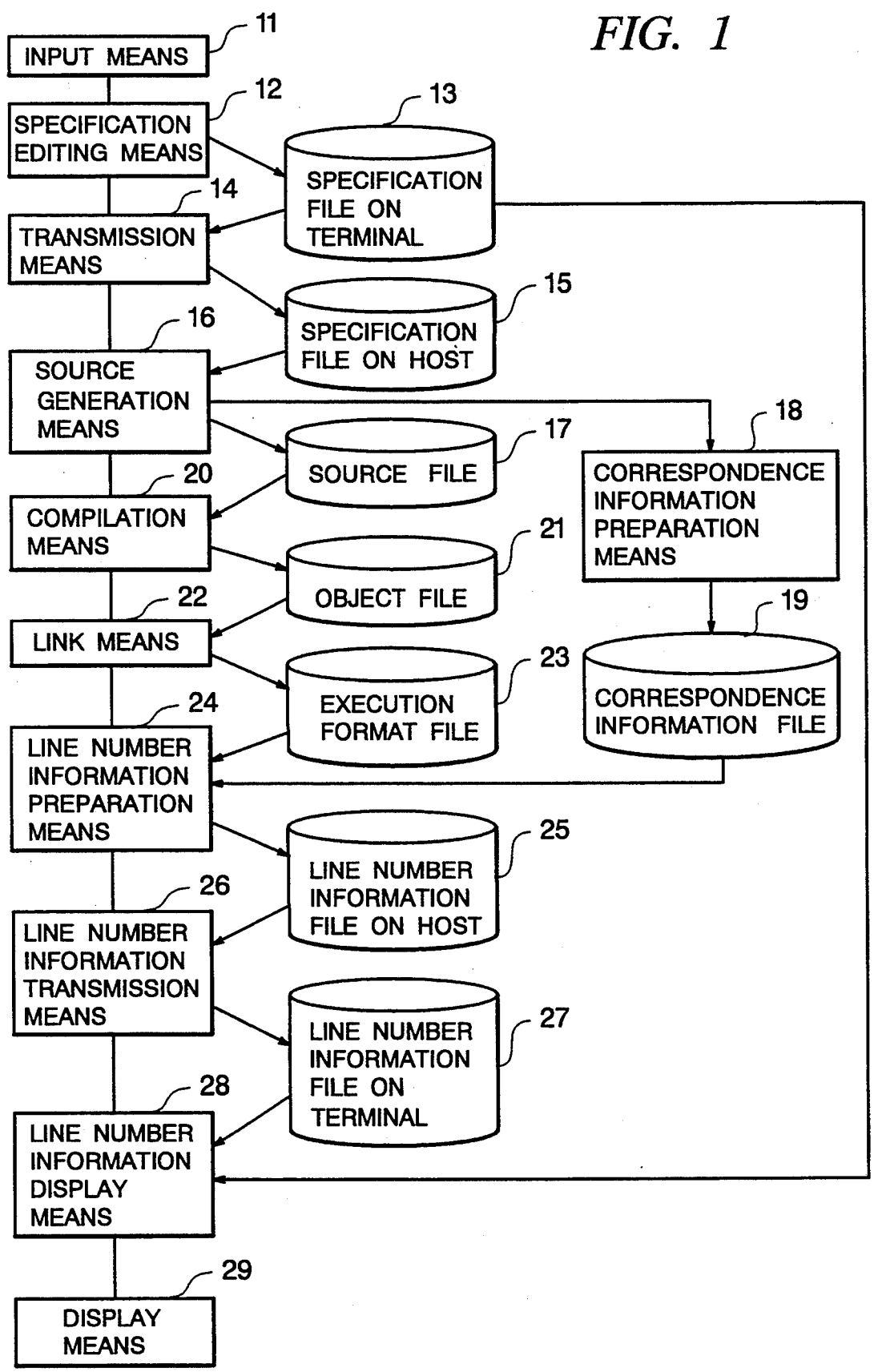
FIG. 1 is a block diagram to show the configuration of an embodiment of a program development support system according to the present invention.

FIG. 1 shows the configuration of a program development support system according to a preferred embodiment of the present invention.

A program development support system of the present invention comprises an input means 11 such as an editor provided at a terminal, a specification editing means 12, a specification file 13 on the terminal, a transmission means 14, a specification file 15 on the host, a source generation means 16, a source file 17, a correspondence information preparation means 18, a correspondence information file 19, a compilation means 20, an object file 21, a link means 22, an execution format file 23, a line number information preparation means 24, a line number information file 25 on the host, a line number information transmission means 26, a line number information file 27 on the terminal, a line number information display means 28, a display means 29 such as a display at the terminal.

Among above components, the specification editing means 12, the transmission means 14, the source generation means 16, the source file 17, the correspondence information preparation means 18, a correspondence information file 19, the compilation means 20, the object file 21, the link means 22, the execution format file 23, the line number information preparation means 24, the line number information transmission means 26, and the line number information display means 28 are provided at the host.

The specification editing means 12 prepares a program specification based on the contents input from the input means 11 (such as an editor) on the terminal and registers the finished specification to the specification file 13 on the terminal. The specification editing means 12 also activates the transmission means 14.

The transmission means 14 transmits the specification which the specification editing means 12 prepared and registered to the specification file 13 on the terminal to the specification file 15 on the host and activates the source generation means 16.

The source generation means 16 generates a source program based on the specification which the transmission means 14 transmitted and registered to the specification file 15 on the host and registers the source program to the source file 17. The source program is generated in widely accepted languages such as FORTRAN or COBOL.

The correspondence information preparation means 18 prepares a table showing the correspondence between the source program in the source file 17 and the specification registered to the specification file 15 on the host and registers the correspondence information table to the correspondence information file 19. It also activates the compilation means 20 during registration to the correspondence information file 19.

The compilation means 20 compiles the source program generated by the source generation means 16 in the source file 17, generates an object program to be registered to the object file 21 and activates the link means 22.

The link means 22 prepares an executable program upon receipt of the object program in the object file 21 generated by the compilation means 20 and registers that executable program to the execution format file 23. At the same time, it triggers the line number information preparation means 24.

The line number information preparation means 24 prepares the line number information table by compressing the correspondence information which the correspondence information preparation means 18 prepared and registered to the correspondence information file 17 and registers it to the line number information file 25 on the host. It also triggers the line number information transmission means 26.

The line number transmission means 26 transmits the line number information table on the line number information file 25 prepared by the line number information preparation means 24 to the line number information file 27 on the terminal for registration.

The line number information display means 28 displays the specification generated by the user on the display means 29 at the terminal. When the user inputs a desired location in the specification, it searches the line number information file 27 transmitted by the line number transmission means 26 and the specification file 13 so as to find out the corresponding line number in the source program generated by the source generation means 16 and displays the source location corresponding to the location in the specification.

FIGS. 2A and 2B show an example of the contents in a correspondence information table 30 and the line number information table 31 used at the line number information preparation mean 24.

The correspondence information table 30 shown in FIG. 2(A) contains the correspondence information which the correspondence information preparation means 18 prepared and stored to the correspondence information file 19. The correspondence information table 30 shows specification pages, specification lines and corresponding start/end lines of generation for the source program.

The line number information table 31 shown in FIG. 2(B) contains the line number information which the line number information preparation means 24 prepared and registered to the line number information file 25 on the host. The line number information table 31 shows specification pages, specification lines and corresponding generation start lines, number of compressions and generation end lines for the source program. It is different from the correspondence information table 30 in that it compresses the ranges where the source program has a single line for one line in the specification.

Figure 3:
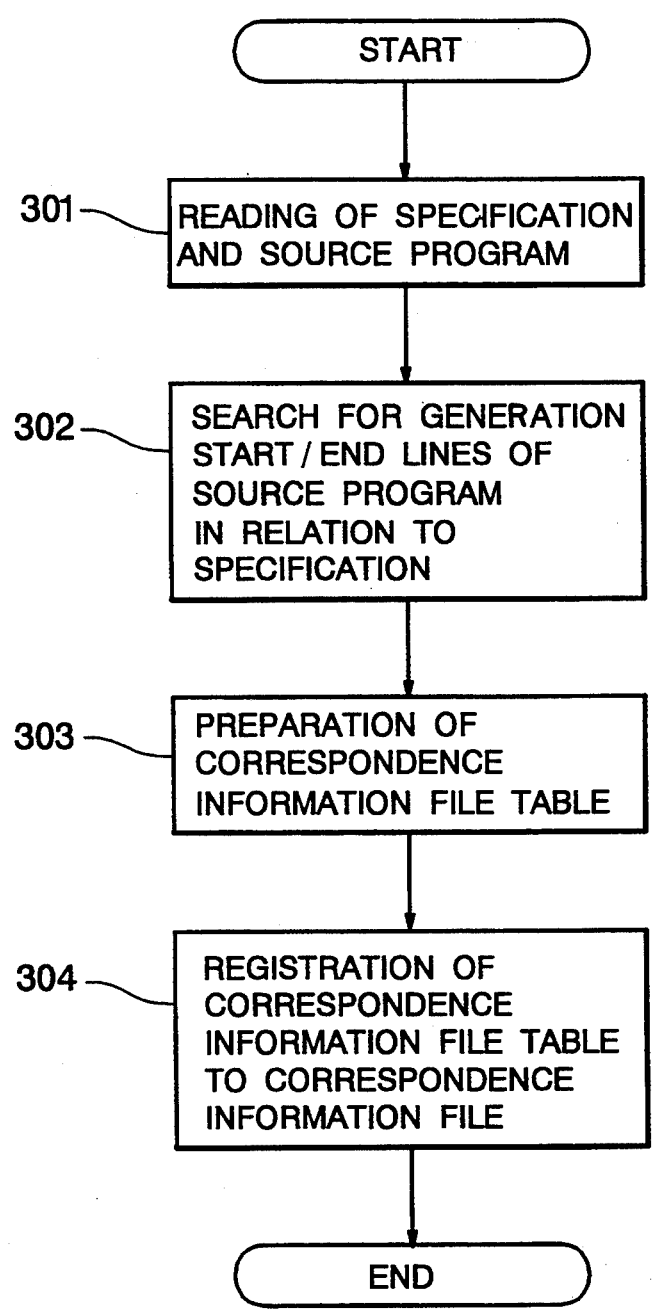
FIG. 3 is a flowchart to illustrate the preparation of the correspondence information table by a correspondence information preparation means.

Referring now to the flowchart of FIG. 3, the preparation of the correspondence information table 30 by the correspondence information preparation means 18 is described.

Firstly, the system reads out a specification from the specification file 15 on the host and a source program from the source file 17 (Step 301). Next, for every line of each page in the specification, it searches for the generation start and generation end lines in the source program (Step 302). This process is performed for all pages and lines in the specification.

Upon completion of the above processing, the system prepares the correspondence information table 30 which has specification page numbers, line numbers for each specification page and line numbers for the start and end of the source program generation corresponding to each line of the specification as shown in FIG. 2A (Step 303). The prepared correspondence information table 30 is recorded to the correspondence information file 19 (Step 304).

Figure 4:
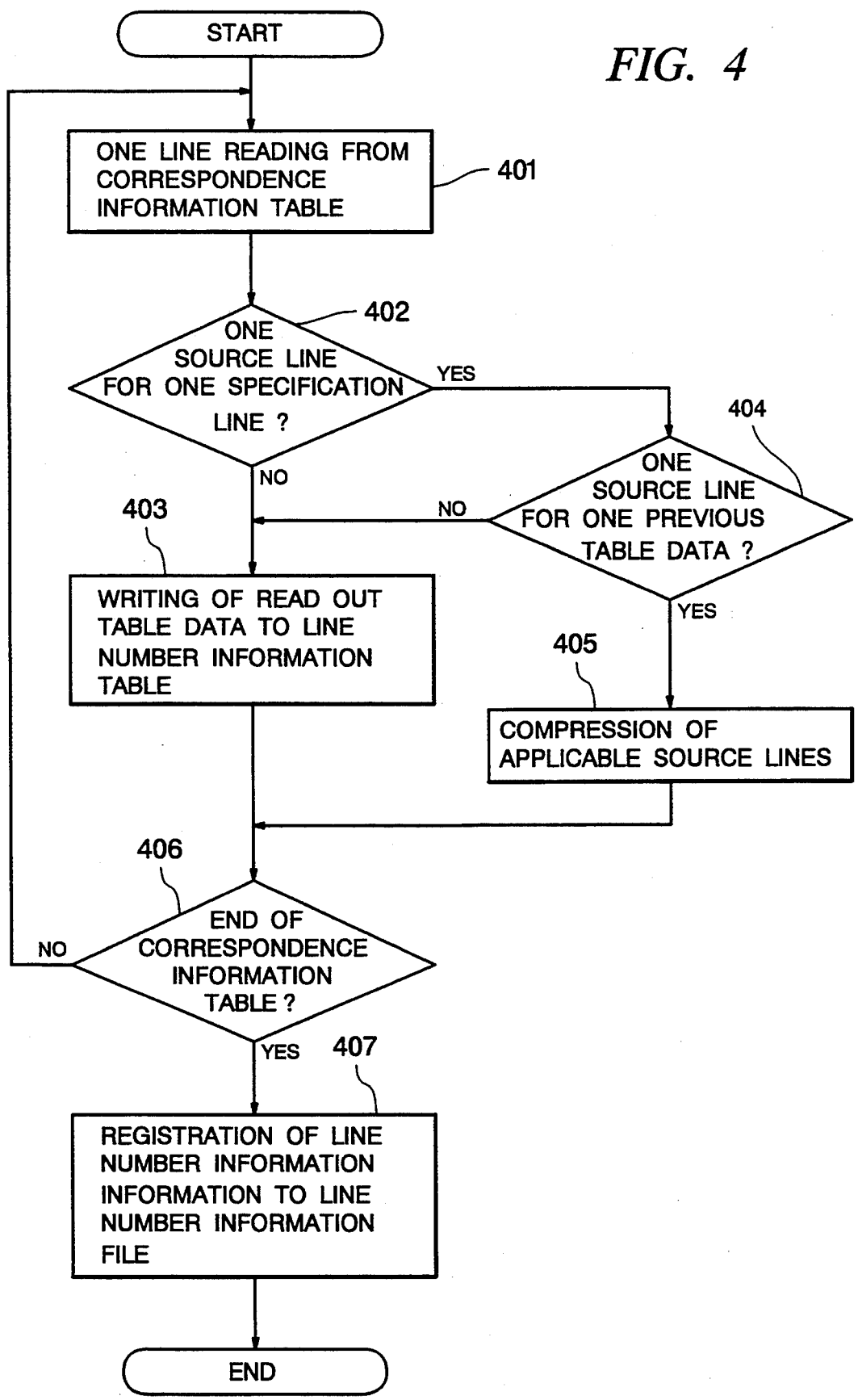
FIG. 4 is a flowchart to illustrate the preparation of the line number information table by a line number information preparation means.

Next, referring to the flowchart of FIG. 4, the process where the line number information preparation means 24 prepares the line number information table 31 with compression of thus prepared correspondence information table 30.

Firstly, the system reads the data line by line from the correspondence information table 30 recorded in the correspondence information file 19 (Step 401). Next, it judges whether the source program generation for one line of the specification starts/ends at the same line (Step 402). In other words, it is judged whether the specification line and the source program line are in one-to-one correspondence. If a single line in the specification corresponds to a plurality of lines in the source program, the data read from the correspondence information table 30 is written to the line number information table 31 as it is (Step 403).

If a single line in the specification corresponds to one line in the source program, then the system checks the data at the previous line to see if the source program has one line for one line of the specification (Step 404). In FIG. 2A, the first line of the correspondence information table 30 shows that the source program has only one line for line 1, page 1 of the specification (the start and end lines are both 1). This causes the judgment in Step 404 to be made. However, for the first line of the correspondence information table 30, there is no previous line table data, and the result of Step 404 is "No".

If the table data of the previous line shows that the source program has more than one line for one line of the specification, the read correspondence information table data is written to the line number information table 31 as it is (Step 403). As a result, the first line of the correspondence information table 30 is written to the line number information table 31 as it is as shown in FIG. 2B.

When the table data of the previous line shows that the source program has only one line for a single line of the specification, the read table data is compressed (Step 405).

In FIG. 2A, the lines 2 and 3 in the correspondence information table 30 show that the source program has one line for each of the lines on a page of the specification (generation starts and ends on the same line). Since the previous line table data shows that the source program has a single line for a single line of the specification here, these data are compressed.

In the compression, as shown in the line number information table 31 of FIG. 2B, the symbol "*" is introduced to the positions corresponding to the lines 2 and 3 on page 1 of the specification in the correspondence information table 30. The number of compressions "2" is given to the column for the generation start line of the source program and the symbol "*" is again introduced at the column for the generation end line. The symbol "*" in the line number information table 31 means omission of the line(s). The value given as the number of compressions in the line number information table 31 indicates the number of lines omitted. In the line number information table 31 of FIG. 2B, the number of compressions is shown in ( ) for convenience in distinction from the generation start line. In actual data, the lines with "*" for the specification line and source program generation end line can be distinguished from other lines and the value for the number of compressions alone is given.

For the compressed lines (omitted lines) in the above line number information table 31, the specification lines and the source program lines are in one-to-one correspondence. Therefore, even for the compressed lines, if the first lines for the specification and the source program are given, a certain location in the specification can be correlated with the line number for the source program by reference to the line number information table 31.

In FIG. 2A, the lines 1 to 5 on page 2 of the specification have one-to-one correspondence between the specification line and the source program line. In this case, the four lines from 2 to 5 are compressed and the number of compressions is set to 4", by omitting the page and lines of the specification and the source program generation start/end lines for those lines.

In the case of the fourth line on the first page of the specification in the correspondence information table 30, the source program corresponding to the single line in the specification has more than one line, and it is judged "No" in Step 402. Thus, the fourth line of the correspondence information table 30 is written to the line number information table 31 as it is in FIG. 2B.

Thereafter, until completion of the correspondence information table 30, the procedure from Step 401 to Step 405 is repeated (Step 406). The preparation of the above line number information table 31 is repeated for each page of the specification in the correspondence information table 30. Thus, the line number information table 31 is prepared. Then, the prepared line number information table 31 is registered to the line number information file 25 on the host (Step 407). By omitting the lines where the specification line and the source program line are in one-to-one correspondence as described above, the line number information table 31 can be obtained as a compression of the correspondence information table 30. The amount of data in the line number information table 31 is remarkably less than that for the correspondence information table 30. Therefore, when the line number information table is transmitted from the line number file 25 on the host to the line number file 27 on terminal by the line number transmission means 26, the transmission requires much less time than the transmission of the correspondence information table 30 as it is.

Referring now to the flowchart of FIG. 5, the line number information display by the line number information display means 28 is described. First of all, the specification registered to the specification file 13 on the terminal is displayed on the display means 29 (Step 501). If the user now designates a certain desired location in the specification using the input means 11 such as an editor (Step 502), then the system searches for the location in the source program corresponding to the designated specification location by using the line number information file 27 on the terminal transmitted by the line number information transmission means 26 and the specification file 13 on the terminal (Step 503). When the location in the source program corresponding to the designated location in the specification is found, the line numbers for that location are given by the generation start/end lines (Step 504).

Thus, upon designation of a location in the specification (line position), the system finds and displays the source program line numbers corresponding to the designated location. This enables quick reference to the source program based on the line numbers when any failure occurs during execution of an execution format program and the specification must be debugged.

In this embodiment, the system does not transmit the correspondence information table 30 with generation start/end lines for the source program set aside the specification lines to the terminal as it is. Instead, it transmits the line number information table 31 with less data amount obtained through compression, by reducing the time required for transmission to the terminal. This results in that, when the line number data for the source program are transmitted to the terminal for reference, prolongation of program development time due to data transmission is minimized.

Obviously, various modifications can be made to the above embodiments. It is intended to cover in the appended claims all such modifications and variations as fall within the true spirit and scope of the present invention.

What is claimed is:

1. A program development support system, comprising:
    a specification preparation means for preparing a specification;
    a specification file to store said specification;
    a source generation means for generating a source program based on the specification stored in said specification file;
    a source file to store said source program;
    a compilation means for compiling said source program to prepare an object program;
    an object file to store said object program;
    a link means for preparing an executable program based on said object program;
    an execution file to store said executable program;
    a correspondence information preparation means for preparing a correspondence information table which contains location data having pages and lines for said specification and line data indicating the lines where the generation starts and ends in said source program corresponding to said location data; and
    a line number information preparation means for reading the correspondence information table prepared by said correspondence information preparation means and omitting a plurality of consecutive line data in the correspondence information table to have a one-to-one correspondence between a line of said specification and a line of the source program in order to generate a line number information table which is a compression table of said correspondence information table.

2. A program development support system as set forth in claim 1, further comprising:
    a line number information display means for displaying the location in said source program corresponding to a designated location in said specification by referring to said line number information table.

3. A program development support system, comprising:
    a specification preparation means for preparing a specification;
    a specification file at a terminal to store said specification;
    a transmission means for transmitting the specification stored in said specification file to a host;
    a specification file at said host to store said transmitted specification;
    a source generation means for generating a source program based on the specification stored in said specification file at the host;
    a source file to store said source program;
    a compilation means for compiling said source program to prepare an object program;
    an object file to store said object program;
    a link means for preparing an executable program based on said object program;
    an execution file to store said executable program;
    a correspondence information preparation means for preparing a correspondence information table which contains location data having pages and lines for said specification and line data indicating the lines where the generation starts and ends in said source program corresponding to said location data;
    a line number information preparation means for reading the correspondence information table prepared by said correspondence information preparation means and, omitting a plurality of consecutive line data in the correspondence information table to have a one-to-one correspondence between a line of said specification and a line of the source program in order to generate a line number information table which is a compression table of said correspondence information table;
    a line number information file in the host to store said line number information table;
    a transmission means for transmitting the line number information table in the line number information file in said host to said terminal;
    a line number information file in the terminal to store said transmitted line number information table; and
    a line number information display means for displaying the location in said source program corresponding to a designated location in said specification read from said specification file in the terminal by referring to said line number information table in the line number information file in the terminal.

4. A program development support system, comprising:
    a specification preparation means for preparing a specification;
    a source generation means for generating a source program based on the specification;
    a compilation means for compiling said source program to prepare an object program;

a link means for preparing an executable program based on said object program;

a correspondence information preparation means for preparing a correspondence information table which contains location data having pages and lines for said specification and line data indicating the lines where the generation starts and ends in said source program corresponding to said location data;

a line number information preparation means for reading the correspondence information table prepared by said correspondence information preparation means, and generating a line number information table, which is a compression table of said correspondence information table, by omitting a plurality of consecutive line data in the correspondence information table to have a one-to-one correspondence between a line of said specification and a line of the source program; and a line number information display means for displaying the location in said source program corresponding to a designated location in said specification by referring to said line number information table.

5. A program development support system as set forth in claim 4, further comprising:

a line number information file in a host to store said line number information table;

a transmission means for transmitting the line number information table in the line number information file in said host to a terminal; and a line number information file in the terminal to store said transmitted line number information table.

6. A program development support system as set forth in claim 4, wherein said line number information preparation means writes the line data read from the correspondence information table to the line number information table as it is when a single line in the specification corresponds to a plurality of lines in the source program, and omits a plurality of consecutive line data in the correspondence information table to have a one-to-one correspondence between a line of said specification and a line of the source program.

7. A program development support system as set forth in claim 4, wherein said line number information preparation means writes the line data read from the correspondence information table to the line number information table as it is when a single line in the specification corresponds to a plurality of lines in the source program, and omits a line of the correspondence information table when the line corresponds to one line in the source program and a previous line corresponds to one line in the source program.

* * * * *